United States Patent [19]
Yamamoto

[11] Patent Number: 5,432,614
[45] Date of Patent: Jul. 11, 1995

[54] ELECTRONIC FILING APPARATUS

[75] Inventor: Keiji Yamamoto, Funabashi, Japan

[73] Assignee: Ricoh Company, Ltd., Tokyo, Japan

[21] Appl. No.: 208,495

[22] Filed: Mar. 10, 1994

Related U.S. Application Data

[63] Continuation of Ser. No. 672,914, Mar. 21, 1991, abandoned.

[30] Foreign Application Priority Data

Mar. 26, 1990 [JP] Japan ................................ 2-75831

[51] Int. Cl.⁶ .............................................. H04N 1/21
[52] U.S. Cl. .................... 358/403; 358/444; 358/468; 395/115; 395/116
[58] Field of Search ............ 358/404, 442, 444, 403, 358/402, 407, 468; 395/115, 116, 114; 355/206

[56] References Cited

U.S. PATENT DOCUMENTS

| | | | |
|---|---|---|---|
| 4,571,069 | 2/1986 | Kimura et al. | 355/206 |
| 4,876,651 | 10/1989 | Dawson et al. | 364/449 |
| 5,119,081 | 6/1992 | Ikehira | 340/723 |
| 5,150,221 | 9/1992 | Shima | 358/403 |

Primary Examiner—Scott A. Rogers
Attorney, Agent, or Firm—Popham, Haik, Schnobrich & Kaufman, Ltd.

[57] ABSTRACT

An electronic filing apparatus has a scanner which successively scans documents, and a memory portion which temporarily stores image information supplied from the scanner, the memory portion having a storage capacity enough to hold the quantity of information from two documents. The apparatus also successively records information from the memory to a disk storage medium, to register a plurality of the documents. The apparatus has respective first and second control means for the scanner and recording portion, so that, as a previously scanned document is written onto the disk storage medium from the memory, a successive document is being scanned and entered into the memory. This arrangement provides fast and efficient storage of successively scanned documents from among a plurality of documents.

7 Claims, 3 Drawing Sheets

ELECTRONIC FILING APPARATUS

This application is a continuation of U.S. patent application Ser. No. 07/672,914, filed Mar. 21, 1991, abandoned in favor of the present application.

BACKGROUND OF THE INVENTION

The present invention relates generally to an electronic filing apparatus, and more particularly to an electronic filing apparatus in which image information is read from a document by an image scanner and the image information is recorded and registered in an optical disk, the electronic filing apparatus being improved so as to reduce the total processing time for reading and writing the image information for more efficient document filing.

In a conventional electronic filing apparatus which is constructed with a so-called personal computer, an image reading unit such as an image scanner is provided for scanning a document to read image information from the document, and for supplying an image signal converted from a light beam reflected from the document when being illuminated. The image information being read by the image reading unit is transferred to a recording unit such as an optical disk drive so that the image information from the document is recorded and registered in a disk storage medium which may be placed in the recording unit. The image reading unit such as an image scanner usually has a function to photoelectrically convert a light beam reflected from a document, when the document is scanned by the image reading unit, into an image signal carrying image information and has a function to supply such an image signal carrying image information. The disk storage medium such as an optical disk, which is placed in the recording unit such as an optical disk drive unit, has a great storage capacity, and one can use this disk storage medium for information storage and subsequent retrieval purposes, by writing image information to the disk storage medium or by retrieving the image information recorded in the disk storage medium.

In a conventional electronic filing apparatus, a plurality of documents are successively one by one read by the scanner and image information from each document is recorded to an optical disk which is a large capacity storage medium described above. However, in a case of the conventional electronic filing apparatus, a reading of image information from one document is completed and then a writing of the image information to the optical disk is performed. Similarly, after the subsequent documents are read by the image scanner, the image information of each document is written to the optical disk. For this reason, in the case of the conventional electronic filing apparatus, the image reading by the image sensor is performed with the image scanner, and alternately to the image reading, the writing of image information to the optical disk. Accordingly, the conventional electronic filing apparatus has a difficulty or problem in that it takes unnecessarily much time to carry out a document filing with an optical disk, because the writing of image information to the optical disk is performed each time the reading of image information from a document is completed by the image scanner. Especially, writing image information to the optical disk is time consuming, when compared with the time required for reading image information from a document, and so the conventional electronic filing apparatus inevitably shows a poor efficiency of document filing in view of the whole document filing system. And, for attaining good efficiency of the document filing system, it is necessary to shorten the writing time required for the conventional electronic filing apparatus to perform a writing of image information to the optical disk.

SUMMARY OF THE INVENTION

Accordingly, it is a general object of the present invention to provide an improved electronic filing apparatus in which the above described problems of the conventional electronic filing apparatus are eliminated.

Another and more specific object of the present invention is to provide an electronic filing apparatus which comprises a reading part for scanning successively a document from among a plurality of documents and for supplying an image signal into which a light beam reflected from the scanned document is photoelectrically converted, the image signal carrying image information from the document, a memory part for temporarily storing the image information supplied from the reading part, the memory part having a storage capacity to store more than a prescribed quantity of information from two documents out of the plurality of documents, a recording part for recording successively the image information temporarily stored in the memory part to a disk storage medium so that image information from the plurality of documents is registered in the disk storage medium, a first control part for controlling operation of the reading part to read image information from a document which is scanned by the reading part, and a second control part for controlling operation of the recording part to write image information to the disk storage medium, the reading part being controlled by the first control part so as to read image information from one document out of the plurality of documents, and the recording part being controlled by the second control part so as to write image information from the previous document onto the disk storage medium simultaneously as when the reading part reads the image information from the document immediately following the previous document out of the plurality of documents. According to the present invention, it is possible to reduce remarkably the total processing time required for carrying out successively a reading of information from a plurality of documents and a writing of information to a disk storage medium. The memory part including a first memory and a second memory which temporarily stores image information from the reading part has a storage capacity to hold information from two or more pages of documents. The electronic filing apparatus has a dedicated controller for receiving image information from the image scanner as the reading part and for supplying the image information to the memory part, and a dedicated controller for writing image information stored in the memory part to an optical disk as a large capacity storage medium. By simultaneously carrying out a reading of image information by the image reading unit and a writing of image information to the optical disk, it is possible to shorten remarkably the total processing time required for reading and writing image information successively from a plurality of documents to an optical disk. This will enable a fast, efficient document filing of the electronic filing apparatus.

Other objects and further features of the present invention will become more apparent from the following detailed description when read in conjunction with the accompanying drawings.

DESCRIPTION OF THE PREFERRED EMBODIMENT

Figure 1:
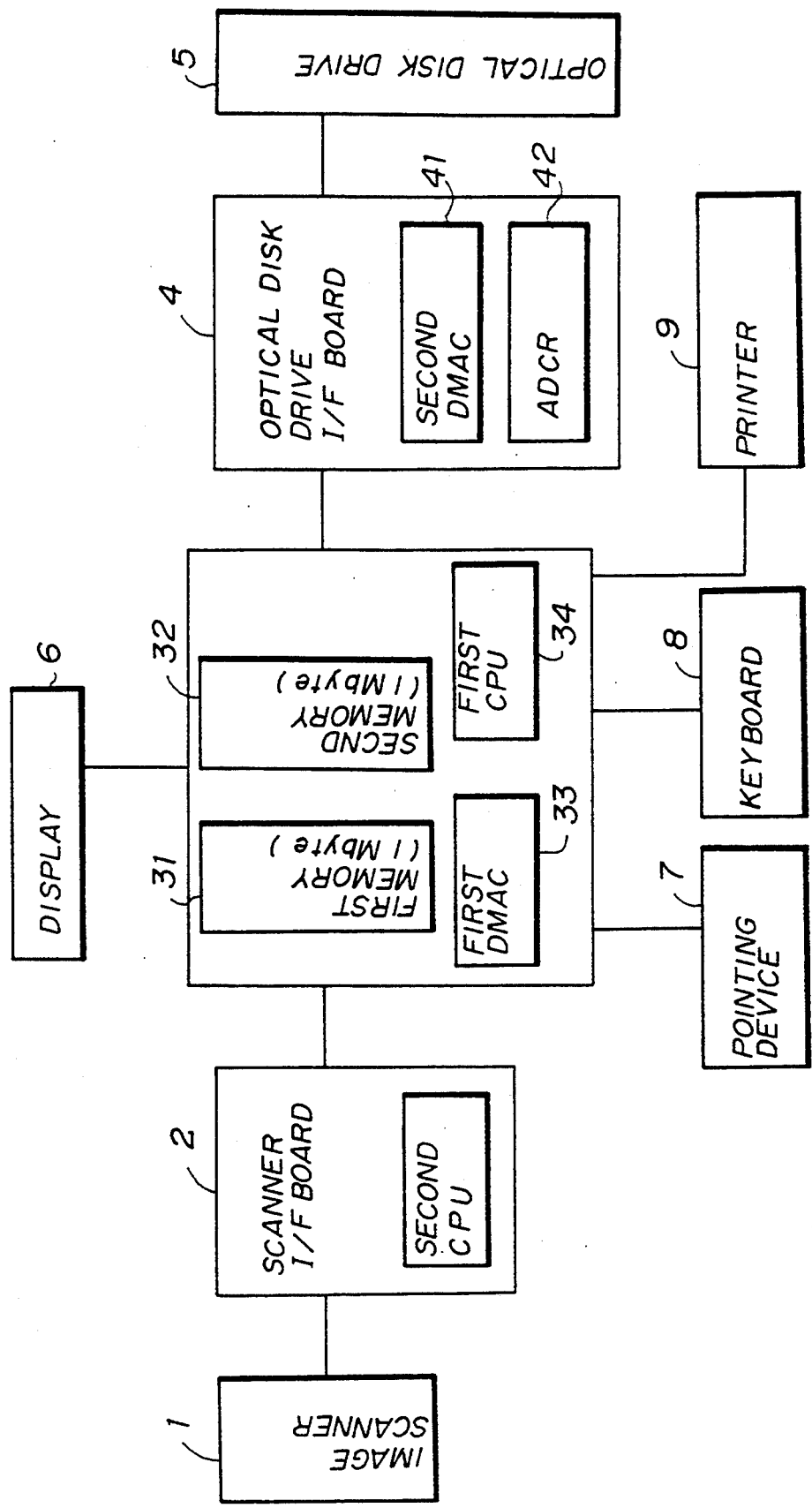
FIG. 1 is a block diagram showing an embodiment of an electronic filing apparatus according to the present invention.

First, a description will be given of an embodiment of an electronic filing apparatus according to the present invention, with reference to FIG. 1. As shown in FIG. 1, the electronic filing apparatus generally has an image scanner 1, a scanner interface board 2, a system main part 3, an optical disk drive interface board 4 and an optical disk drive 5. The image scanner 1 is provided for reading image information from a document by scanning the document with a light beam and supplying an image signal converted photoelectrically from a light beam reflected from the document when being scanned. The system main part 3 includes a first memory 31 having a storage capacity corresponding to one page (for example, 1 Mbyte capacity), a second memory 32 having a storage capacity corresponding to one page (for example, 1 Mbyte capacity) and a first central processing unit (CPU) 34. The scanner interface board 2 includes a second central processing unit (CPU) 21. The optical disk drive interface board 4 includes a second direct memory access controller 41 and the so-called ADCR 42. The electronic filing apparatus shown in FIG. 1 further includes a display 6, a pointing device 7, a keyboard 8 and a printer 9 which are all connected to and controlled by the system main part 3. With the electronic filing apparatus having the above described construction, it is possible to retrieve information stored in an optical disk which is placed into the optical disk drive unit 5.

In FIG. 1, the first memory 31 and the second memory 32 which are provided in the system main part 3 are both a buffer memory, and these memories have a storage capacity enough to store the quantity of image information from two or more pages of documents which are read by and supplied from the image scanner 1. The first CPU 34 provided in the system main part 3 operates as a master CPU of the second CPU 21 provided in the scanner interface board 2, and this first CPU 34 executes a control program, which is stored in a memory (not shown) in the system main part 3, for controlling the operation of the whole electronic filing apparatus. The second CPU 21 in the scanner interface board 2 constitutes a dedicated controller which operates for receiving image information supplied from the image scanner 1 which operates as an image reading unit of the electronic filing apparatus and for transferring the received image information to the first memory 31 in the system main part 2. The first DMAC 33 and the first CPU 34, both being provided within the system main part 3, and the second DMAC 41 in the optical disk drive interface board 4, constitute a dedicated controller that operates for controlling a recording of the image information, stored in the first memory 31 or the second memory 32, onto the optical disk placed into the optical disk drive unit 5.

Figure 2:
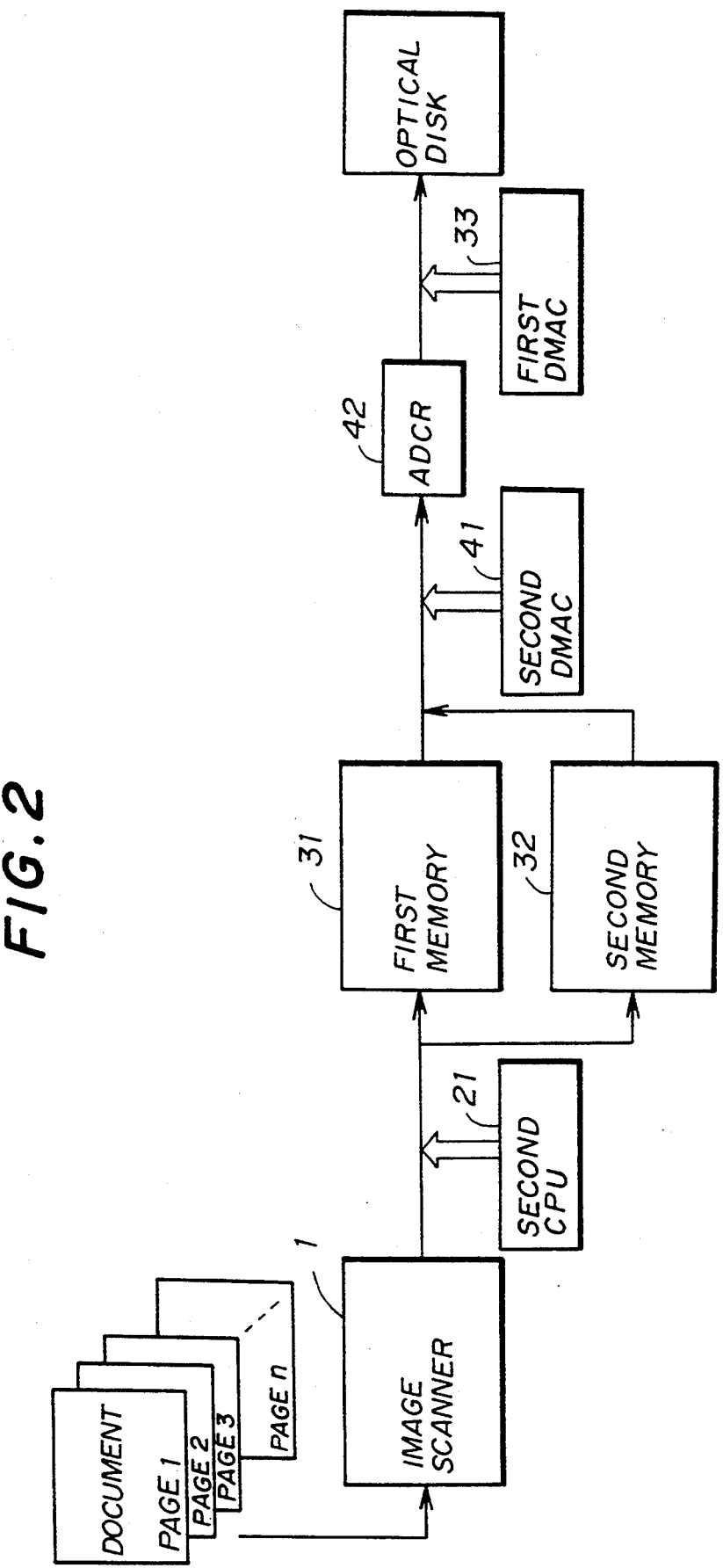
FIG. 2 is a diagram for explaining the reading and writing operations of the electronic filing apparatus shown in FIG. 1.

Next, a description will be given of the reading and writing operations of the electronic filing apparatus according to the present invention for explaining the flow of image data being processed when a plurality of documents are sequentially read by the image scanner 1, with reference to FIG. 2. In FIG. 2, those parts which are the same as those corresponding parts shown in FIG. 1 are designated by the same reference numerals, and a description thereof will be omitted. In the electronic filing apparatus according to the present invention, a plurality of documents indicated by PAGE 1 to PAGE n in FIG. 2 are read by means of the image scanner 1, and image information from the documents is stored alternately in the first memory 31 and the second memory 32.

As shown in FIG. 2, image information from the first page PAGE 1 out of the documents (corresponding to a 1 Mbyte capacity) is read by means of the image scanner 1, and the image information is first transferred to the first memory 31 of the system main part 3 by the control of the second CPU 21 in the scanner interface board 2. Next, image information from the second page PAGE 2 is read by the image scanner 1 and transferred by the control of the second CPU 21 to the second memory 32. Similarly, image information from the subsequent pages PAGE to PAGE n is read by the image scanner 1 and transferred by the control of the second CPU 21 alternately to the first memory 31 or the second memory 32. The image information stored in the first memory 31 and the second memory 32 are transferred to the ADCR 42 of the optical disk drive interface board 4 by the control of the second DMAC 41 in the optical disk drive interface board 4. A compression of the image information transferred is carried out by this ADCR 42 to produce a compressed image data. This compressed image data is transferred from the ADCR 42 of the optical disk drive interface board 4 to the optical disk drive unit 5 by the control of the first DMAC 33 in the system main part 3 so that the compressed image data is recorded to the optical disk in the optical disk drive unit 5.

Figure 3:
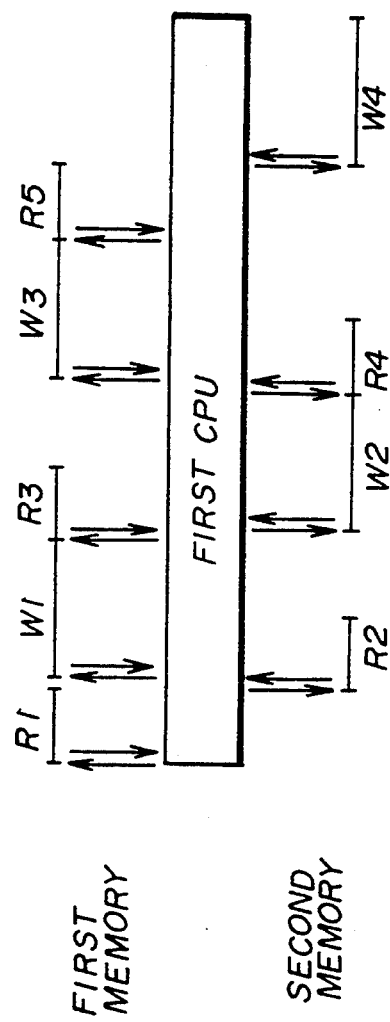
FIG. 3 is a diagram for explaining the parallel processing of reading and writing by the control of a first central processing unit in the electronic filing apparatus shown in FIG. 1.

As described in the foregoing, image information is read successively from the plurality of documents PAGE 1 to PAGE n by the image scanner 1 and transferred alternately to the first memory 31 or the second memory 32, and this image information is transferred to the optical disk drive 5 and recorded in the optical disk therein. FIG. 3 indicates more specifically the operation steps controlled by the first CPU 34 which are chronologically taken in the reading and writing operations of the electronic filing apparatus shown in FIG. 1. In FIG. 3, Rn (for example, R1) indicates a reading time period for which image information is read by the image scanner 1 from a document, and Wn (for example, W1) indicates a writing time period for which the image information is recorded in the optical disk by the optical disk drive unit. As described above, the first CPU 34 of the system main part 3 executes a control program for controlling the operations of the first DMAC 33, the second DMAC 21 and the second CPU 21 to carry out the above described reading and writing operations of the electronic filing apparatus.

At first, the first CPU 34 instructs the second CPU 21 in the scanner interface board 2 to read image information from the first page PAGE 1 out of the documents by the image scanner 1 and transfer the image information to the first memory 31 first. This scanner input time required to read image information from the first page and transfer it to the first memory corresponds with a time period indicated by "R1" in FIG. 3. The first CPU 34 is in a waiting condition until the scanner input processing of the second CPU 21 for reading the first page is completed. When the scanner input processing of the second CPU 21 is ended, the first CPU 34 then instructs the second CPU 21 to read image information from the second page PAGE 2 of the documents by the image scanner 1 and transfer the image information to the second memory 32. This scanner input time required to read image information from the second page and transfer it to the second memory 32 corresponds with a time period indicated by "R2" in FIG. 3.

Next, the first CPU 34 instructs the first DMAC 33, the second DMAC 41 and the ADCR 42 to write the image information of the first page, stored in the first memory 31, to the optical disk. And, the first CPU 34 is in a waiting condition until the optical disk writing processing of the second DMAC 41 is ended. This optical disk writing time required to write the image information to the optical disk corresponds with a time period indicated by "W1" in FIG. 3. As being apparent from FIG. 3, the optical disk writing for the first page as indicated by "WI" and the scanner reading for the second page as indicated by "R2" take place simultaneously. After the optical disk writing processing is ended, the first CPU 34 instructs the second CPU 21 to read image information from the third page PAGE 3 by the image scanner 1 and transfer the image information to the first memory 31. This scanner input time required to read the image information from the third page by the image scanner 1 corresponds with a time period indicated by "R3" in FIG. 3. At the same time as the scanner input time "R3" the first CPU 34 instructs the second DMAC 41, the ADCR 42 and the first DMAC 33 to write the image information of the second page, stored in the second memory 32, to the optical disk in the optical disk drive unit 5. And, the first CPU 34 is in a waiting condition until the optical disk writing processing by the second DMAC 41 is ended, This optical disk writing time required to write the image information of the page 2 to the optical disk in the optical disk drive unit 5 corresponds with a time period indicated by "W2" in FIG. 3. As shown in FIG. 3, the scanner reading for the third page as indicated by "R3" and the optical disk writing for the second page as indicated by "W2" take place simultaneously. When the optical disk writing for the image information from the third page is ended, the first CPU 34 instructs the second CPU 21 to read image information from the fourth page PAGE 4 out of the documents and transfer the image information to the first memory 31. This scanner input time required to read the image information and transfer it to the first memory corresponds with a time period indicated by "R4" in FIG. 3.

As described above, in the electronic filing apparatus having a set of the two memories 31 and 32, each having a storage capacity enough to hold a prescribed quantity of information from one document, it is possible to carry out a parallel processing of a reading and a writing by recording image information sent sequentially from several documents alternately onto the first memory 31 or onto the second memory 32. For example, if image information from a document is first transferred to the first memory 31, the image information stored in the first memory 31 is first written onto the optical disk while image information from a next document is read and transferred to the second memory 32. And, the image information from the next document stored in the second memory 32 is written onto the optical disk simultaneously as when image information is read from a following document by the image scanner 1 and transferred to the first memory 31.

Accordingly, in a case of the electronic filing apparatus of the present invention, the total optical disk writing time required for writing image information onto the optical disk is approximately equal to the total processing time of reading and writing processes, and, according to the present invention, it is possible to reduce remarkably the total processing time of reading and writing processes required.

Further, the present invention is not limited to the above described embodiment, and variations and modifications may be made without departing from the scope of the present invention.

What is claimed is:

1. An electronic filing apparatus, comprising:
   a) reading means for successively scanning individual documents from among a plurality of documents and for supplying an image signal into which a light beam reflected from the scanned document is photoelectrically converted, the image signal carrying image information from the document;
   b) memory means for temporarily storing the image information supplied from said reading means, the memory means having a storage capacity no larger than an amount needed to hold a quantity of information from two documents out of the plurality of documents, wherein said memory means includes a first memory and a second memory, each of which has a storage capacity no longer than an amount needed to hold a quantity of information from one document out of the plurality of documents;
   c) recording means for successively recording the image information, temporarily stored in said memory means, to a disk storage medium so that image information from the plurality of documents is registered in the disk storage medium;
   d) first control means for controlling operation of said reading means to read image information from a given document which is scanned by said reading means; and
   e) second control means for controlling operation of said recording means to write image information to the disk storage medium, the second control means constituting means for controlling the recording means to write image information onto the disk storage medium from a previous document preceding the given document, at the same time as the reading means reads the image information from the given document;
   wherein said first control means and said second control means control operation of said reading means and said recording means such that image information from a subsequent one of two successively scanned documents out of the plurality of documents is read by said reading means at the same time as image information from a preceding one of said two successively scanned documents is written to the disk storage medium by said recording means in an alternate manner.

2. An electronic filing apparatus, comprising:

a) reading means for successively scanning individual documents from among a plurality of documents and for supplying an image signal into which a light beam reflected from the scanned document is photoelectrically converted, the image signal carrying image information from the document;

b) memory means for temporarily storing the image information supplied from said reading means, the memory means having a storage capacity no larger than an amount needed to hold a quantity of information from two documents out of the plurality of documents; wherein said memory means includes:
a first memory and a second memory, each of said first memory and said second memory having a storage capacity no larger than an amount needed to hold a quantity of information from one document out of the plurality of documents;

c) recording means for successively recording the image information which was temporarily stored in said memory means to a disk storage medium so that image information from the plurality of documents is registered in the disk storage medium;

d) first control means for controlling operation of said reading means to read image information from a given document which is scanned by said reading means; and e) second control means for controlling operation of said recording means to write image information to the disk storage medium, the second control means constituting means for controlling the recording means to write image information onto the disk storage medium from a previous document preceding the given document, at the same time as the reading means reads the image information from the given document;

wherein said first control means and said second control means control operation of said reading means and said recording means such that image information from a subsequent one of two successively scanned documents out of the plurality of documents is ready by said reading means at the same time as image information from a preceding one of said two successively scanned documents is written to the disk storage medium by said recording means in an alternate manner.

3. The apparatus as claimed in claim 2, wherein said reading means is controlled by said first control means so as to store image information from the plurality of documents alternately in the first memory and in the second memory.

4. The apparatus as claimed in claim 2, wherein said recording means is controlled by said second control means so as to write image information alternately from either the first memory or the second memory onto the disk storage medium.

5. The apparatus as claimed in claim 1, wherein said reading means comprises an image scanner for reading image information from a document successively one by one from the plurality of documents.

6. The apparatus as claimed in claim 1, wherein said first control and said second control means controls operations of said reading means and said recording means, respectively, such that one document out of the plurality of documents is scanned and image information from said document is transferred to the first memory when image information already stored in the second memory is written to the disk storage medium, and a next document out of the plurality of documents is scanned and image information from said next document is transferred to the second memory when image information already stored in the first memory is written to the disk storage medium.

7. The apparatus as claimed in claim 1, wherein said first control means is a secondary central processing unit provided in an interface board for controlling operation of said reading means to read image information from a document and transfer the image information to the buffer memory means.

* * * * *